US012676885B2

(12) United States Patent (10) Patent No.: US 12,676,885 B2
Robinson et al. (45) Date of Patent: Jul. 7, 2026

(54) NEURAL NETWORKS FOR MITIGATING BUSINESS EMAIL COMPROMISE (BEC) EVENTS

(71) Applicant: International Business Machines Corporation, Armonk, NY (US)

(72) Inventors: Nikki Elyse Robinson, Davidsonville, MD (US); Richard Howe, Mebane, NC (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 18/677,568

(22) Filed: May 29, 2024

(65) Prior Publication Data

US 2025/0373658 A1 Dec. 4, 2025

(51) Int. Cl.
H04L 9/40 (2022.01)

(52) U.S. Cl.
CPC ...... H04L 63/1483 (2013.01); H04L 63/1416 (2013.01); H04L 63/1425 (2013.01)

(58) Field of Classification Search
CPC ............. H04L 63/1483; H04L 63/1416; H04L 63/1425
See application file for complete search history.

(56) References Cited

U.S. PATENT DOCUMENTS 5,272,723 A * 12/1993 Kimoto .................... G06N 3/09
375/232
7,636,944 B2 * 12/2009 Raikar .................. H04L 51/212
726/1

9,948,663 B1 * 4/2018 Wang .................. H04L 63/1416
10,397,272 B1 * 8/2019 Bruss .................... G06N 3/0442
10,594,714 B2 * 3/2020 Crabtree ................ H04L 63/20
(Continued)

FOREIGN PATENT DOCUMENTS

WO 2024010463 A1 1/2024

OTHER PUBLICATIONS

Priya, S., S. Selvakumar, and R. Leela Velusamy. "Detection of phishing attacks using radial basis function network trained for categorical attributes." 2020 11th International Conference on Computing, Communication and Networking Technologies (ICCCNT). IEEE, 2020. (Year: 2020).*

(Continued)

*Primary Examiner* — David Garcia Cervetti
(74) *Attorney, Agent, or Firm* — Michael A. Petrocelli

(57) ABSTRACT

A computer-implemented method (CIM), according to one embodiment, includes training a first neural network on email behavioral characteristics drawn from a threat intelligence data lake, and training a second neural network on email technical characteristics drawn from the threat intelligence data lake. The method further includes inputting data from an Endpoint Detection and Response (EDR) system, network traffic, and email to the neural networks for causing the neural networks to analyze the data. An alert related to Business Email Compromise (BEC) is generated based on output(s) from the neural networks. A computer program product (CPP), according to another embodiment, includes a set of one or more computer-readable storage media, and program instructions, collectively stored in the set of one or more storage media, for causing a processor set to perform the foregoing method.

18 Claims, 6 Drawing Sheets

(56) References Cited

U.S. PATENT DOCUMENTS

| | | | | |
|---|---|---|---|---|
| 10,666,676 | B1 * | 5/2020 | Hsu | H04L 63/1425 |
| 10,834,127 | B1 | 11/2020 | Yeh et al. | |
| 10,938,839 | B2 * | 3/2021 | Humphries | G06N 5/046 |
| 11,050,793 | B2 | 6/2021 | Jeyakumar et al. | |
| 11,165,735 | B1 * | 11/2021 | Varghese | G06Q 10/107 |
| 11,296,868 | B1 * | 4/2022 | Maglalang | H04L 9/3239 |
| 11,431,738 | B2 | 8/2022 | Jeyakumar et al. | |
| 11,552,969 | B2 * | 1/2023 | Jeyakumar | H04L 63/1416 |
| 11,595,336 | B2 | 2/2023 | Jakobsson | |
| 11,861,563 | B2 | 1/2024 | Batchu et al. | |
| 12,289,323 | B1 * | 4/2025 | Holub | G06N 20/00 |
| 12,445,465 | B2 * | 10/2025 | Jiang | H04L 63/1408 |
| 12,499,401 | B2 * | 12/2025 | Gopathy | G06Q 10/0635 |
| 2003/0187937 | A1 * | 10/2003 | Yao | H04L 51/212 |
| | | | | 715/744 |
| 2006/0265745 | A1 * | 11/2006 | Shackleton | G06F 21/552 |
| | | | | 726/22 |
| 2012/0198002 | A1 * | 8/2012 | Goulart | H04L 51/56 |
| | | | | 709/206 |
| 2015/0215334 | A1 * | 7/2015 | Bingham | H04L 63/1425 |
| | | | | 726/23 |
| 2015/0264084 | A1 * | 9/2015 | Kashyap | H04L 63/1483 |
| | | | | 726/22 |
| 2016/0014151 | A1 | 1/2016 | Prakash | |
| 2016/0057167 | A1 * | 2/2016 | Bach | H04L 63/101 |
| | | | | 726/23 |
| 2017/0048273 | A1 | 2/2017 | Bach | |
| 2018/0091467 | A1 * | 3/2018 | Andrianakou | G06Q 30/0631 |
| 2018/0248896 | A1 * | 8/2018 | Challita | G06F 21/554 |
| 2019/0349356 | A1 * | 11/2019 | McElwee | G06F 21/552 |
| 2020/0218984 | A1 * | 7/2020 | Thornton | G06N 3/0455 |
| 2020/0258044 | A1 * | 8/2020 | Lin | G06Q 10/107 |
| 2020/0396190 | A1 * | 12/2020 | Pickman | H04L 67/306 |
| 2021/0058428 | A1 * | 2/2021 | Arlitt | H04L 63/1416 |
| 2021/0168161 | A1 * | 6/2021 | Dunn | H04L 51/212 |
| 2021/0243202 | A1 * | 8/2021 | Kraus | G05B 19/058 |
| 2021/0266345 | A1 * | 8/2021 | Chen | H04L 63/1425 |
| 2021/0273950 | A1 * | 9/2021 | Lawson | H04L 63/20 |
| 2021/0273961 | A1 * | 9/2021 | Humphrey | H04L 63/1433 |
| 2022/0092177 | A1 * | 3/2022 | Herwono | G06F 21/562 |
| 2022/0109649 | A1 * | 4/2022 | Korotkikh | G06N 3/08 |
| 2022/0156367 | A1 * | 5/2022 | Stein | G06N 3/0442 |
| 2022/0224724 | A1 * | 7/2022 | Bazalgette | H04L 63/1441 |
| 2022/0230142 | A1 * | 7/2022 | Batchu | H04L 51/212 |
| 2022/0255950 | A1 * | 8/2022 | Dedenok | H04L 51/08 |
| 2022/0286432 | A1 | 9/2022 | Chechik et al. | |
| 2022/0294751 | A1 * | 9/2022 | Slobodyanuk | G06F 18/2321 |
| 2022/0294763 | A1 * | 9/2022 | Slobodyanuk | G06N 3/09 |
| 2022/0394047 | A1 * | 12/2022 | Lee | H04L 63/145 |
| 2022/0400094 | A1 * | 12/2022 | Sampath | G06F 40/30 |
| 2023/0007042 | A1 * | 1/2023 | Haworth | H04L 63/205 |
| 2023/0012220 | A1 * | 1/2023 | Humphrey | H04L 41/16 |
| 2023/0056471 | A1 * | 2/2023 | Sambamoorthy | H04L 51/08 |
| 2023/0075964 | A1 * | 3/2023 | Singh | G06N 3/045 |
| 2023/0171287 | A1 * | 6/2023 | Slobodyanuk | H04L 51/212 |
| | | | | 726/23 |
| 2023/0205888 | A1 * | 6/2023 | Tyagi | G06F 21/577 |
| | | | | 726/26 |
| 2023/0224327 | A1 * | 7/2023 | Haworth | H04L 63/1441 |
| | | | | 726/23 |
| 2023/0283629 | A1 * | 9/2023 | Boyer | H04L 63/1416 |
| | | | | 726/22 |
| 2023/0308472 | A1 * | 9/2023 | Boyer | G06F 40/40 |
| 2023/0336571 | A1 * | 10/2023 | Costa | H04L 63/1416 |
| 2023/0403294 | A1 * | 12/2023 | Bazalgette | H04L 63/1441 |
| 2023/0403296 | A1 * | 12/2023 | Pickman | H04L 63/1441 |
| 2023/0403559 | A1 * | 12/2023 | Ranganathan | G06N 3/045 |
| 2024/0010463 | A1 | 1/2024 | Zhang et al. | |
| 2024/0031392 | A1 * | 1/2024 | Ahn | H04L 63/1416 |
| 2024/0045990 | A1 * | 2/2024 | Boyer | G06F 21/6245 |
| 2024/0064160 | A1 * | 2/2024 | Zhang | G06N 3/088 |
| 2024/0098100 | A1 * | 3/2024 | Lal | H04L 63/1416 |
| 2024/0106854 | A1 * | 3/2024 | Dedenok | H04L 63/145 |
| 2024/0114053 | A1 * | 4/2024 | Katz | H04L 63/1483 |
| 2024/0137378 | A1 * | 4/2024 | Sellars | G06N 5/046 |
| 2024/0144319 | A1 * | 5/2024 | Saidi | G06Q 30/0254 |
| 2024/0221231 | A1 * | 7/2024 | Deshpande | H04N 19/86 |
| 2024/0223592 | A1 * | 7/2024 | Bazalgette | H04L 41/16 |
| 2024/0223596 | A1 * | 7/2024 | Sellars | H04L 63/1433 |
| 2024/0242104 | A1 * | 7/2024 | Abhyankar | G06N 10/60 |
| 2024/0333743 | A1 * | 10/2024 | Bazalgette | H04L 63/1416 |
| 2024/0356969 | A1 * | 10/2024 | Brabec | G06Q 10/107 |
| 2024/0403428 | A1 * | 12/2024 | Lal | G06F 21/566 |
| 2024/0406195 | A1 * | 12/2024 | Sansom | H04L 63/1416 |
| 2024/0406210 | A1 * | 12/2024 | Sellars | G06F 9/45558 |
| 2024/0414211 | A1 * | 12/2024 | Boyer | H04L 63/1416 |
| 2024/0422114 | A1 * | 12/2024 | Seshadri | H04L 51/212 |
| 2025/0030744 | A1 * | 1/2025 | Stride | H04L 63/1433 |
| 2025/0184341 | A1 * | 6/2025 | Khot | H04L 63/1425 |
| 2025/0238511 | A1 * | 7/2025 | Pickman | G06K 7/1452 |
| 2025/0267156 | A1 * | 8/2025 | Pickman | H04L 63/1408 |
| 2026/0046873 | A1 * | 2/2026 | Vyas | H04W 28/065 |

OTHER PUBLICATIONS

Lobo, Royce, Muhammad Naveed Abbas, and Mamoona Naveed Asghar. "Email phishing attack detection using recurrent and feed-forward neural networks." 2023 Cyber Research Conference-Ireland (Cyber-RCI). IEEE, 2023. (Year: 2023).*

Nasim Maleki, "A Behavioral Based Detection Approach for Business Email Compromises," University of New Brunswick, Dec. 2019, pp. 93.

Paul Reedy, "Interpol review of digital evidence for 2019-2022," Forensic Science International: Synergy, 2023, pp. 162, Retrieved from https://www.sciencedirect.com/science/article/pii/S2589871X22000985?via%3Dihub.

Pubudu Gayan Buddhika, "Detecting Business Email Compromise and Classifying for Countermeasures," Auckland University of Technology, School of Engineering, Computer and Mathematical Sciences, 2023, pp. 112.

Maleki, N., "A Behavioral Based Detection Approach for Business Email Compromises," Thesis, University of New Brunswick, Dec. 2019, 93 pages.

Reddy, P., "Interpol review of digital evidence for 2019-2022," Forensic Science International: Synergy, 2023, 162 pages.

Buddhika, P., "Detecting Business Email Compromise and Classifying for Countermeasures," Thesis, Auckland University of Technology, School of Engineering, Computer and Mathematical Sciences, 2023, 112 pages.

IBM, "What is a cyberattack?" IBM Think, 2024, 16 pages, retrieved from https://www.ibm.com/topics/cyber-attack.

IBM, "What is business email compromise (BEC)?" IBM Think, 2024, 14 pages, retrieved from https://www.ibm.com/topics/business-email-compromise.

* cited by examiner

100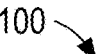

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

NEURAL NETWORK USE CODE

150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

200

202    Train a first neural network on email behavioral characteristics drawn from a threat intelligence data lake 204    Train a second neural network on email technical characteristics drawn from the threat intelligence data lake 206    Input data from an Endpoint Detection and Response (EDR) system, network traffic, and email to the neural networks for causing the neural networks to analyze the data

208

NO    Abnormality?    YES

End

210    Generate an alert related to Business Email Compromise (BEC) based on output(s) from the neural networks

FIG. 2

Input (Layer 1):

24 nodes, each node corresponds to a given hour within a day

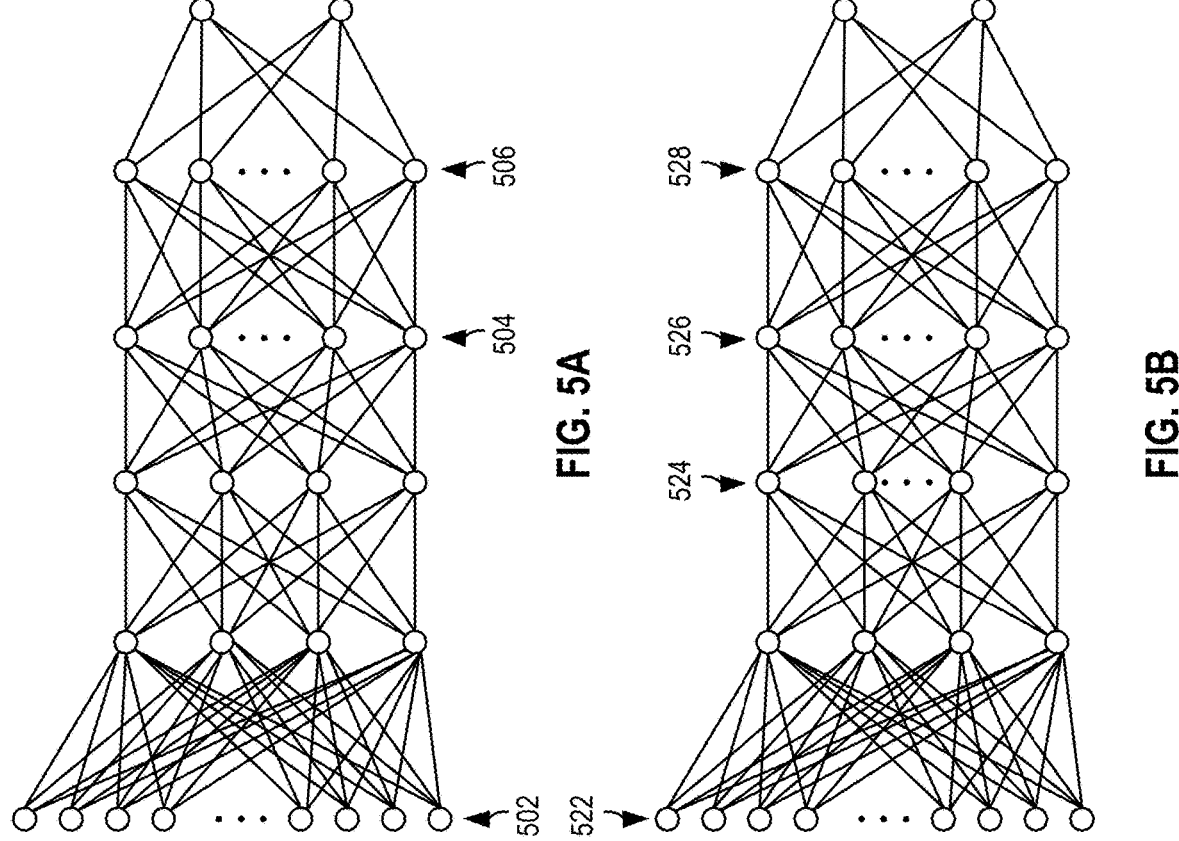
FIG. 5A
FIG. 5B

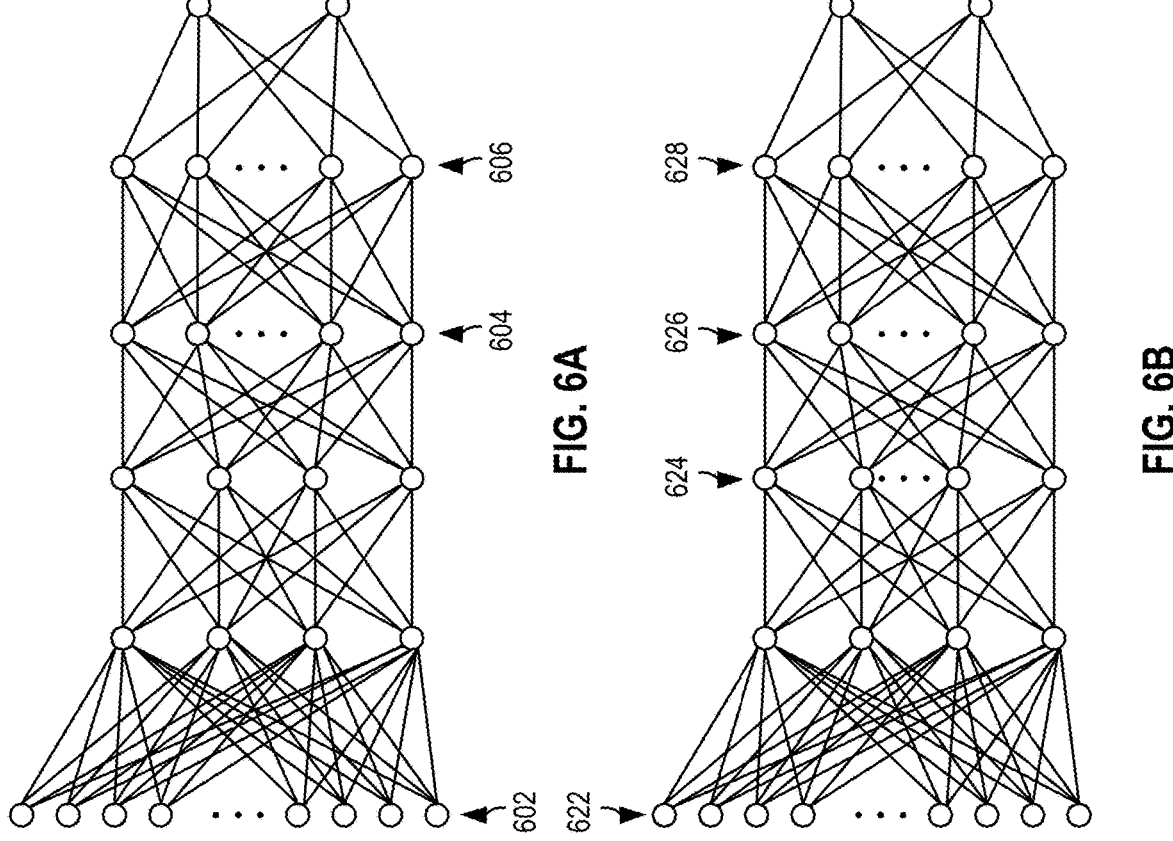
FIG. 6A
FIG. 6B

NEURAL NETWORKS FOR MITIGATING BUSINESS EMAIL COMPROMISE (BEC) EVENTS

BACKGROUND

The present invention relates to cyberattacks, and more specifically, this invention relates to business email compromise (BEC) attacks.

A cyberattack is any intentional effort to steal, expose, alter, disable, or destroy data, applications, or other assets through unauthorized access to a network, computer system or digital device. Some types of cyberattack are email-based cyberattacks. For example, business email compromise, or BEC, is a spear-phishing email scam that attempts to steal money or sensitive data from a business. In a BEC attack, a cybercriminal sends employees of the target organization emails that appear to be from a fellow employee, a vendor, partner, customer or other associate. The emails trick the employees into paying fraudulent invoices, wiring transfers to bogus bank accounts, or divulging sensitive information such as customer data, intellectual property or corporate financials.

SUMMARY

A computer-implemented method (CIM), according to one embodiment, includes training a first neural network on email behavioral characteristics drawn from a threat intelligence data lake, and training a second neural network on email technical characteristics drawn from the threat intelligence data lake. The method further includes inputting data from an Endpoint Detection and Response (EDR) system, network traffic, and email to the neural networks for causing the neural networks to analyze the data. An alert related to Business Email Compromise (BEC) is generated based on output(s) from the neural networks.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 2 is a flowchart of a method, in accordance with one embodiment of the present invention.

FIG. 5A is a neural network diagram, in accordance with one embodiment of the present invention.

FIG. 5B is a neural network diagram, in accordance with one embodiment of the present invention.

FIG. 6A is a neural network diagram, in accordance with one embodiment of the present invention.

FIG. 6B is a neural network diagram, in accordance with one embodiment of the present invention.

DETAILED DESCRIPTION

Figure 3:
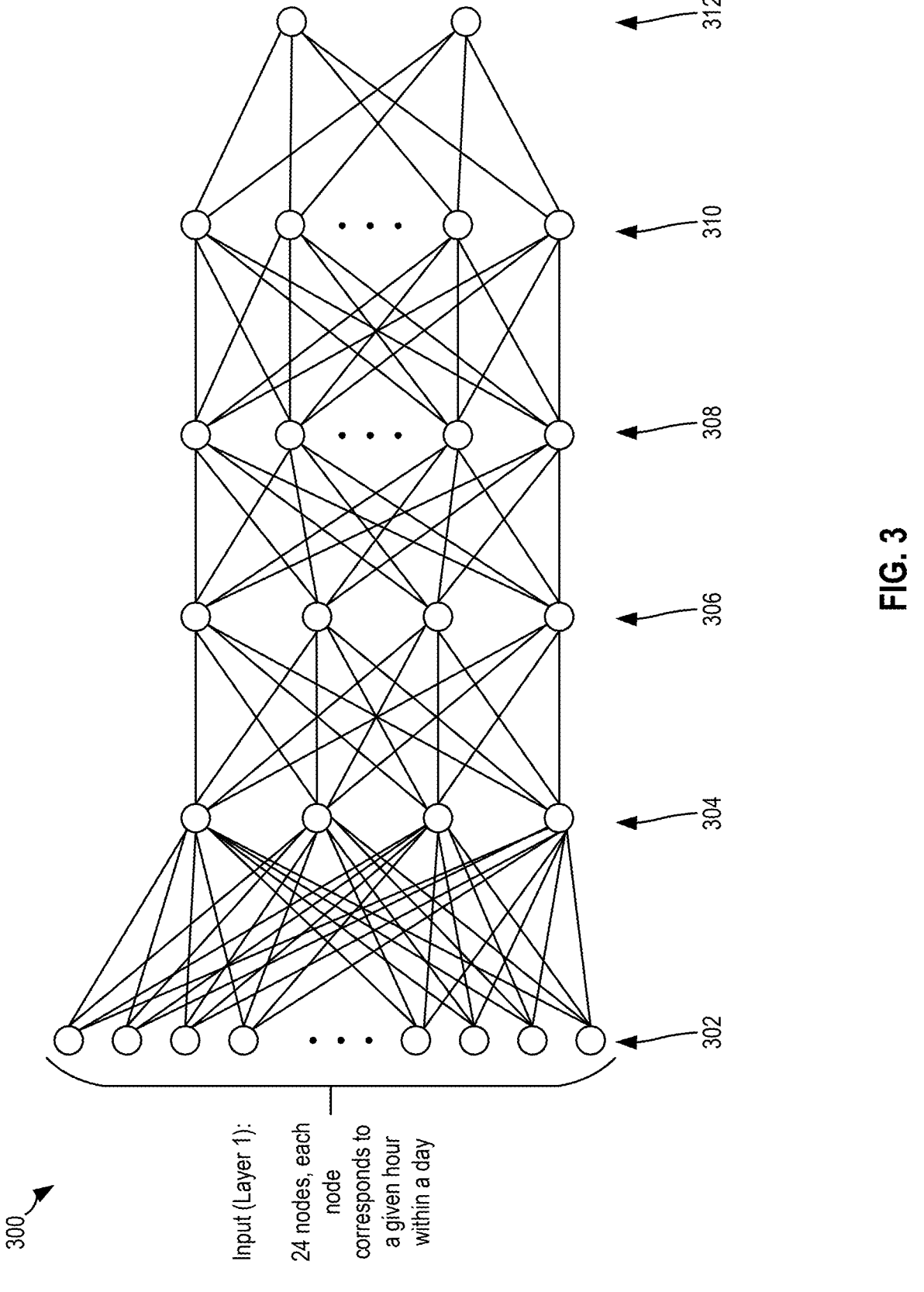
FIG. 3 is a neural network diagram, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for use of neural networks for mitigating BEC events.

In one general embodiment, a CIM includes training a first neural network on email behavioral characteristics drawn from a threat intelligence data lake, and training a second neural network on email technical characteristics drawn from the threat intelligence data lake. The method further includes inputting data from an Endpoint Detection and Response (EDR) system, network traffic, and email to the neural networks for causing the neural networks to analyze the data. An alert related to Business Email Compromise (BEC) is generated based on output(s) from the neural networks.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as neural network use code of block 150 for use of neural networks for mitigating BEC events. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, a cyberattack is any intentional effort to steal, expose, alter, disable, or destroy data, applications, or other assets through unauthorized access to a network, computer system or digital device. Some types of cyberattack are email-based cyberattacks. For example, business email compromise, or BEC, is a spear-phishing email scam that attempts to steal money or sensitive data from a business. In a BEC attack, a cybercriminal sends employees of the target organization emails that appear to be from a fellow employee, a vendor, partner, customer or other associate. The emails trick the employees into paying fraudulent invoices, wiring transfers to bogus bank accounts, or divulging sensitive information such as customer data, intellectual property or corporate financials.

Conventional attempts to mitigate cyberattacks, including BEC attacks have proven inefficient, as cyberattacks continue to evolve and cause damage to businesses and people's personal devices/assets. BEC attacks can cost millions of dollars, if not more, to an organization, and some smaller businesses have had to close because of the volume of loss that results from such an attack.

Techniques of embodiments and approaches described herein use neural networks to account for multiple data streams which connect in a variety of ways, before receiving multiple outputs of data to action on potential BEC attacks. Furthermore, these techniques utilize neural networks to account for the inefficiencies, with respect to integration, associated with human intelligence-based and technical data-based conventional cyberattack mitigation techniques. More specifically, the techniques described herein use multiple radial-based neural networks to calculate a score of technical and behavioral components to detect a business email compromise attack. These techniques relatively improve the technical field of cyber-electronics by engineering advancements in detection alerting for BEC, reduce financial loss to businesses, and ultimately reducing the number of recovery computer operations that are performed in networks (which reduces traffic within such networks).

Now referring to FIG. 2, a flowchart of a method 200 is shown according to one embodiment. The method 200 may be performed in accordance with aspects of the present invention in any of the environments depicted in FIGS. 1-6B, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Method 200 includes use of a plurality of neural networks. Accordingly, in some approaches, method 200 may include developing one or more neural networks using techniques that would become apparent to one of ordinary skill in the art after reading the descriptions herein. In some preferred approaches, at least some of the neural networks are radial-based neural networks, and therefore, in one or more of such approaches, two radial-based neural networks may be developed independently, e.g., container deployments on RED HAT OPENSHIFT on AMAZON WEB SERVICES (ROSA).

Development of such neural networks, in some approaches, includes training a first neural network on email behavioral characteristics drawn from a threat intelligence data lake, e.g., see operation 202. In some preferred approaches, the first neural network is a radial-based neural network. Training the first neural network on email behavioral characteristics drawn from the threat intelligence data lake may, in some approaches, include, causing the first neural network to monitor and learn characteristics pre-associated with email behavioral characteristics. For context, by causing the first neural network to monitor and learn characteristics pre-associated with email behavioral characteristics, a relative "norm" of email behavioral characteristics that occur within a network and/or predetermined business, outside of the occurrence of BEC events, is caused to be dynamically learned by the first neural network.

In some preferred approaches, the email behavioral characteristics include attack patterns. These attack patterns, are in some approaches, obtained from a BEC attack analysis engine and/or that is configured to analyze and characterize the events that led up to and/or occur during previous historical attack events. In some other approaches, the email behavioral characteristics may additionally and/or alternatively include email cadence, e.g., historical email cadence of a plurality of devices associated with a predetermined business, historical email cadence of a given user, etc. The email behavioral characteristics may additionally and/or alternatively include data associated with messaging forms, e.g., short message service (SMS), email, SLACK/TEAMS integration, etc. The email behavioral characteristics may additionally and/or alternatively include data associated with user-specific profiles (C-Suite versus administrator versus human resources), etc. Data associated with advanced persistent threats (APT) and/or known BEC methods may additionally and/or alternatively make up the email behavioral characteristics. These email behavioral characteristics may be added to and maintained in a predetermined portion of the data lake, e.g., a behavior analysis data bank of the data lake that is caused to be ingested by the first neural network.

Various optional operations that may be performed in order to train the first neural network on email behavioral characteristics drawn from a behavioral analysis data bank of the data lake are described below. For example, in some approaches, the email behavioral characteristics used to train the first neural network includes email cadence. In such an approach the first neural network is caused, e.g., instructed, to ingest emails via an email product and/or email security API to cause the first neural network to learn the frequency in which emails are normally sent within an associated business and/or network, and to whom such emails are normally sent to.

In some approaches, the email behavioral characteristics used to train the first neural network may additionally and/or alternatively include messaging forms. During this training the first neural network is caused, e.g., instructed, to ingest messages associated with an organization's (predetermined business's) instant messaging solution API and learn a frequency in which messages are sent and to whom the messages are normally sent to. The email behavioral characteristics used to train the first neural network may additionally and/or alternatively include user-specific profiles. During such training, the first neural network is caused, e.g., instructed, to ingest organizational contact and employee information to build a profile for each employee of a predetermined organization, e.g., business.

The training of the first neural network may, in some approaches, include causing the first neural network to ingest threat intel data from predetermined sources, e.g., such as MITRE ATT&CK, THREATCONNECT, and/or RECORDEDFUTURE, to learn what relevant BEC compromise methods are in an environment, e.g., a network, that the predetermined business operates in. Attack patterns, e.g., of historical cyberattack events, may, in some approaches, be ingested for the training. These attack patterns may include threat intel data from sources such as X-Force, MITRE ATT&CK, THREATCONNECT, and/or RECORDEDFUTURE to learn what relevant BEC compromise methods are in an environment, e.g., a network, that the predetermined business operates in.

Operation 204 includes training a second neural network on email technical characteristics drawn from the threat intelligence data lake. In some preferred approaches, the second neural network is a radial-based neural network.

Similar to training of the first neural network on email behavioral characteristics, the training of the second neural network on email technical characteristics drawn from the threat intelligence data lake may, in some approaches, include, causing the second neural network to monitor and learn characteristics pre-associated with email technical characteristics. For context, by causing the second neural network to monitor and learn characteristics pre-associated with email technical characteristics, a relative "norm" of email technical characteristics that occur within a network and/or predetermined business, outside of the occurrence of BEC events, is caused to be dynamically learned by the second neural network. Various examples of email technical characteristics are provided below.

In some approaches, the email technical characteristics include data associated with spoofed email addresses, e.g., such as a list of email addresses that are known and/or suspected of being used in one or more spoofing events. Data associated with compromised user accounts may additionally and/or alternatively make up the email technical characteristics. The email technical characteristics may additionally and/or alternatively include known malicious internet protocols (IPs) and/or domains, network scanning, technical threat intelligence (such as intelligence data obtained on an open-source platform), etc.

Various optional operations that may be performed in order to train the second neural network on email technical characteristics drawn from a technical indicator data bank of the data lake are described below. For example, in some approaches, the email technical characteristics used to train the second neural network includes user account compromise data. More specifically, this training may include causing, e.g., instructing, the second neural network to programmatically parse historical data from prior incident response cases to determine whether the credentials for a given user account have ever been exfiltrated. Spoofed email addresses may additionally and/or alternatively be used to train the second neural network. For example, the second neural network may be caused to programmatically parse historical data from prior incident response cases to determine whether a given email address has been used in prior phishing and/or spear phishing attacks.

Known malicious IP addresses may additionally and/or alternatively be used to train the second neural network. For example, the second neural network may be caused to query source and destination IP addresses associated with a given email against a search ending, e.g., Shodan and VirusTotal, to determine if a given IP is associated with malicious email activity. Open-Source Intelligence (OSINT) sources may additionally and/or alternatively be used to train the second neural network. For example, the second neural network may be caused to leverage a RecordedFuture API to extract credential leak and account compromise data to determine whether a given set of credentials have been leaked.

Regarding the data lake mentioned above, in some approaches, method 200 may include developing and/or maintaining the data lake that includes data that is used to train one or more of the neural networks. In some approaches, developing and/or maintaining the data lake may include ongoingly adding and organizing data associated with use of a network, e.g., a network that a predetermined business interacts within, into the data lake. Further techniques that would become apparent to one of ordinary skill in the art after reading the descriptions herein may additionally and/or alternatively be performed in order to develop and/or maintain the data lake. These email technical characteristics may be added to and maintained in a predetermined portion of the data lake, e.g., a technical indicators data bank of the data lake that is caused to be ingested by the first neural network.

Based on the training of the first and second neural networks, the first and second neural networks are preferably configured to be able to analyze data to determine whether a cyberattack event, e.g., such as a BEC, is likely to and/or has occurred. These cyberattack events may be identified by the first and/or second neural networks as abnormalities within the normal functioning of a predetermined entity, e.g., such as a predetermined business and/or user associated therewith. Accordingly, in some approaches, predetermined data is input, integrated, to the neural networks for causing the neural networks to analyze the data, e.g., see operation 206. In other words, the data sources are pulled together into the neural networks as data ingest points. In preferred approaches, the data includes any combination of data from an Endpoint Detection and Response (EDR) system, network traffic, and email. It should be noted that this data may be obtained from the data lake and thereby input to one or more of the neural networks, or, in some other approaches, may be real-time data that is obtained from the predetermined business and input directly into the one or more of the neural networks. Use of the trained neural networks to analyze the data is described below.

In some approaches, in order to cause the neural networks to analyze the data, method 200 may include instructing the neural networks to analyze the data input to the neural networks. The instructions may, in some approaches, specify operations for the neural networks to perform in order to analyze the data input to the neural networks. For example, analyzing the data, may, in some approaches include generating one or more diagrams that detail the data, e.g., a behavioral analysis neural network diagram and generating a technical indicators neural network diagram. For example, the behavioral analysis neural network diagram preferably includes a plurality of first points each representative of events associated with one of email behavioral characteristics. Furthermore, in some approaches, the technical indicators neural network diagram may preferably include a plurality of second points each representative of events associated with one of email technical characteristics. In some approaches, such points are only added to the diagrams in response to a determination that an event associated with a given one of the characteristics has occurred, e.g., each point represents a different detected occurrence of an associated characteristic over a predetermined amount of time depicted within the diagram.

It should be noted that, in some approaches, the points of the diagrams are specific to a user of a predetermined business. In some other approaches, the points of the diagrams are specific to a plurality of users of a predetermined business, e.g., user-related profiles may be created for executives, administrators, assistants, etc. In yet some other approaches, the points of the diagrams are specific to a user deices of a predetermined business. These user profiles may, in some approaches, be used to test deployment of the techniques described herein with subset of the users, e.g., to reduce an amount of processing operations that are associated with testing of the neural networks during training before use of the networks than would otherwise be performed.

Based on inputting the data to the neural network and/or instructing the neural networks, the neural networks may, in some approaches, be caused to analyze the data by determining whether the data includes a predetermined type of initial notification. For context, the predetermined type of initial notification may include a predetermined behavioral analysis and/or technical indicator(s). The analysis by the neural network(s) may additionally and/or alternatively determine whether a predetermined type of alert is present within the data, e.g., a notification of possible BEC compromise.

In yet another approach, the analysis may include determining whether a predetermined type of containment operation has been performed and/or should be performed, e.g., lock user account, suspend email access, etc. In some approaches, such a containment operation may be recommended in an alert (described in greater detail in operation 210) and/or initiated in an optional operation of method 200.

The analysis may, in some approaches, additionally and/or alternatively include determining whether another type of response should be pursued. For example, in some approaches, the data may be compared with historical data to determine an appropriate response for preventing and/or mitigating a cyberattack such as a BE. This optional analysis may include generating and/or correlating the data with a report of details of attack and outcome, e.g., historical records that detail past cyberattacks and response effectiveness. These optional operations relatively improve detection and training of models used to mitigate BEC events.

One or more outputs may be obtained from the neural networks. For example, in some approaches, an output of the neural networks may be generated based on a predetermined process for analyzing the neural network diagrams. The predetermined process may, in some approaches, include determining a first mathematical average of values associated with first points of a behavioral analysis neural network diagram. The predetermined process may, in some approaches, additionally and/or alternatively include determining a second mathematical average of values associated with second points of a technical indicators neural network diagram. With the averages determined, the predetermined process may include comparing the first mathematical average to a first predetermined threshold and/or comparing the second mathematical average to a second predetermined threshold. For context, the predetermined threshold(s) may serve as thresholds for characteristics of the occurrence of a cyberattack event, e.g., a BEC event. For example, in response to a determination that one or more of the predetermined thresholds are exceeded, a determination may be made that a BEC event has occurred and/or is likely to occur.

Decision 208 includes determining, from at least one output of the neural networks, whether an abnormality exists in a predetermined network and/or business associated with the data evaluated by the neural networks. In some approaches, such a determination is based on the comparison of the mathematical averages with predetermined thresholds. For example, in response to a determination that one or more of the predetermined thresholds have been exceeded, an abnormality may be determined to exist, e.g., a BEC event may be determined to be relatively likely to occur and/or have occurred. In some approaches, an alert may be generated in response to such a determination. For example, operation 210 includes generating an alert related to BEC based on output(s) from the neural networks. More specifically, the alert is generated in response to a determination that the first mathematical average exceeds the first predetermined threshold, in some approaches. In some other approaches, the alert is additionally and/or alternatively generated in response to a determination that the second mathematical average exceeds the second predetermined threshold.

In some other approaches, the method 200 optionally ends in response to a determination that an abnormality is not detected, e.g., see "NO" logical path of decision 208.

An optional operation of method 200, in some approaches, includes performing tuning on the first neural network and/or the second neural network based on the output(s) from the neural networks. The type of tuning may depend on the approach. For example, in some approaches, the tuning includes changing a rate of data ingestion. In some other approaches, the tuning additionally and/or alternatively includes changing a mathematical formula to calculate the output(s). In yet some other approaches, the tuning may additionally and/or alternatively include changing at least one of the thresholds used to analyze the neural network diagrams.

In some approaches, a post analysis engine may be configured and caused to determine an accuracy of the output(s) of the neural networks. For example, the post analysis engine may be configured to tune data ingestion and calculation to determine which aspects of the neural networks need tailoring. In some other approaches, the detected and/or predicted BEC events may be evaluated to determine whether the output of the neural networks in fact prevented and/or mitigated a cyberattack.

FIG. 3 depicts a behavioral analysis neural network diagram 300, in accordance with one embodiment. As an option, the present behavioral analysis neural network diagram 300 may be implemented in conjunction with features from any other embodiment listed herein, such as those described with reference to the other FIGS. Of course, however, such behavioral analysis neural network diagram 300 and others presented herein may be used in various applications and/or in permutations which may or may not be specifically described in the illustrative embodiments listed herein. Further, the behavioral analysis neural network diagram 300 presented herein may be used in any desired environment.

The behavioral analysis neural network diagram 300 includes a plurality of email behavioral characteristics along an x-axis of the neural network diagram 300, e.g., see email cadence 302, messaging form 304, user-specific profiles 306, APT known BEC compromise methods 308, attack patterns 310 and final determination 312. The points (e.g., also referred to as "nodes" in FIG. 3) in each of the respective email behavioral characteristics are each representative of events associated with an associated one of email behavioral characteristics.

Figure 4:
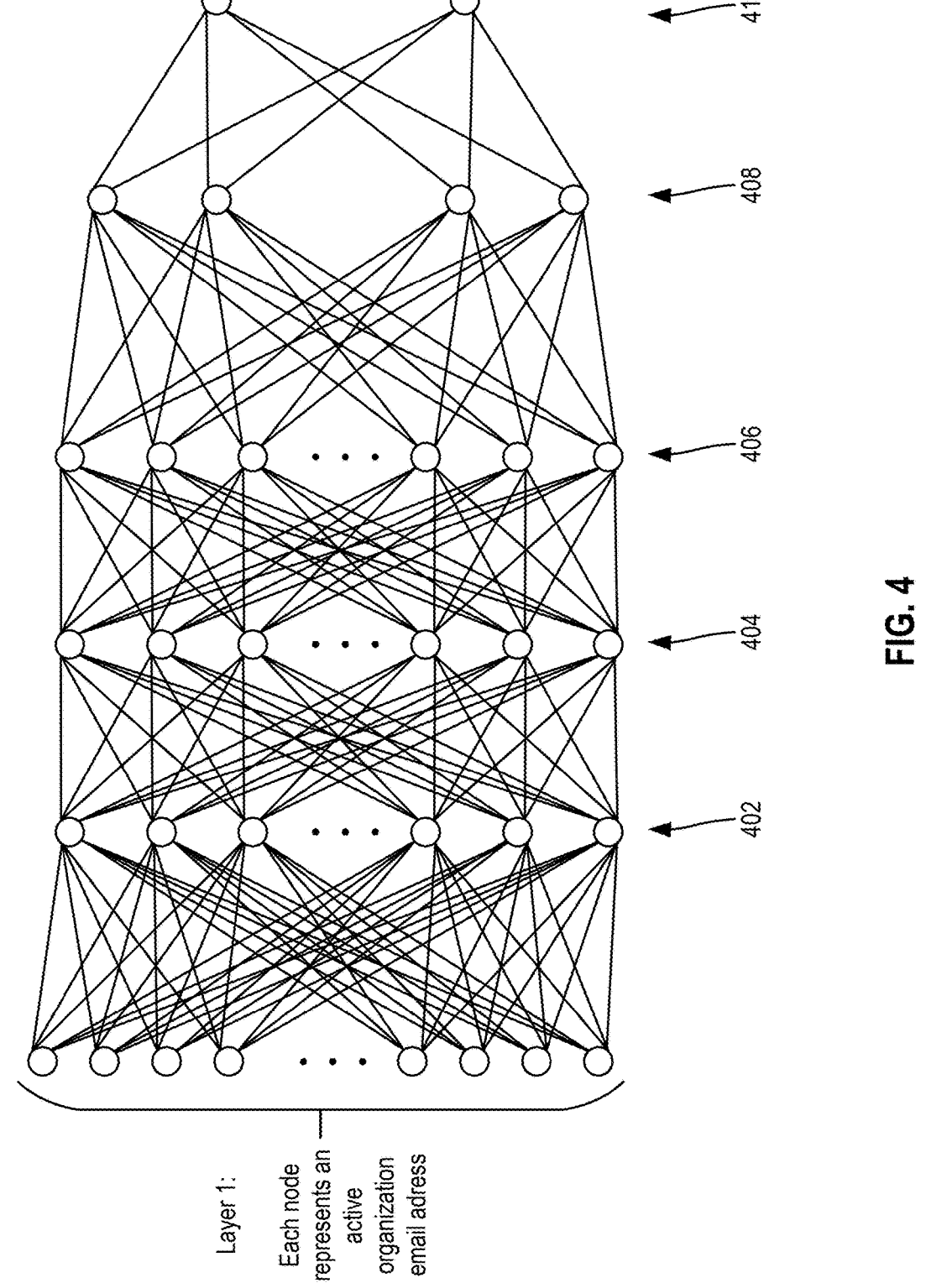
FIG. 4 is a neural network diagram, in accordance with one embodiment of the present invention.

FIG. 4 depicts a technical indicators neural network diagram 400, in accordance with one embodiment. As an option, the present technical indicators neural network diagram 400 may be implemented in conjunction with features from any other embodiment listed herein, such as those described with reference to the other FIGS. Of course, however, such technical indicators neural network diagram 400 and others presented herein may be used in various applications and/or in permutations which may or may not be specifically described in the illustrative embodiments listed herein. Further, the technical indicators neural network diagram 400 presented herein may be used in any desired environment.

The technical indicators neural network diagram 400 includes a plurality of email technical characteristics along an x-axis of the technical indicators neural network diagram 400, e.g., see user account compromise 402, spoofed email addresses 404, known malicious IP addresses 406, OSINT sources 408, and final determination 410. The points (e.g., also referred to as "nodes" in FIG. 4) in each of the respective email technical characteristics are each representative of events associated with an associated one of email technical characteristics.

FIGS. 5A-5B depict neural network diagrams 500 and 520, in accordance with several embodiments. As an option, the present neural network diagrams 500 and 520 may be implemented in conjunction with features from any other embodiment listed herein, such as those described with reference to the other FIGS. Of course, however, such neural network diagrams 500 and 520 and others presented herein may be used in various applications and/or in permutations which may or may not be specifically described in the illustrative embodiments listed herein. Further, the neural network diagrams 500 and 520 presented herein may be used in any desired environment.

Referring first to FIG. 5A, the neural network diagram 500 includes a plurality of email technical characteristics that may be evaluated by trained neural networks to determine whether a BEC event has occurred and/or is likely to occur. For example, a mathematical average of some of the email technical characteristics may be determined. It may be assumed that nine points are present for email technical characteristic user account logins 502, seven points are present for email technical characteristic unique IP address 504, and eight points are present for email technical characteristic network traffic 506. A mathematical average of these points equals eight points, which may be compared to a predetermined threshold value, e.g., seven points. In response to a determination that the predetermined threshold has been exceeded, an account of a business that the diagrams are based on may be determined to be compromised, and an alert may be issued.

Referring next to FIG. 5B, the neural network diagram 520 includes a plurality of email behavioral characteristics that may be evaluated by trained neural networks to determine whether a BEC event has occurred and/or is likely to occur. For example, a mathematical average of some of the email behavioral characteristics may be determined. It may be assumed that ten points are present for email behavioral characteristic messaging form 522, nine points are present for email behavioral characteristic email context 524, eight points are present for email behavioral characteristic new sender 526, and nine points are present for email behavioral characteristic emails determination 528. A mathematical average of these points equals nine points, which may be compared to a predetermined threshold value, e.g., seven points. In response to a determination that the predetermined threshold has been exceeded, an account of a business that the diagrams are based on may be determined to be compromised, and an alert may be issued.

FIGS. 6A-6B depict neural network diagrams 600 and 620, in accordance with several embodiments. As an option, the present neural network diagrams 600 and 620 may be implemented in conjunction with features from any other embodiment listed herein, such as those described with reference to the other FIGS. Of course, however, such neural network diagrams 600 and 620 and others presented herein may be used in various applications and/or in permutations which may or may not be specifically described in the illustrative embodiments listed herein. Further, the neural network diagrams 600 and 620 presented herein may be used in any desired environment.

Referring first to FIG. 6A, the neural network diagram 600 includes a plurality of email technical characteristics that may be evaluated by trained neural networks to determine whether a BEC event has occurred and/or is likely to occur. For example, a mathematical average of some of the email technical characteristics may be determined. It may be assumed that ten points are present for email technical characteristic user account logins 602, ten points are present for email technical characteristic device logins 604, and eight points are present for email technical characteristic unique IP address 606. A mathematical average of these points equals eight and a half points, which may be compared to a predetermined threshold value, e.g., seven points. In response to a determination that the predetermined threshold has been exceeded, an account that is contacted by a predetermined business that the diagrams are based on may be determined to be spoofed, and an alert may be issued.

Referring next to FIG. 6B, the neural network diagram 620 includes a plurality of email behavioral characteristics that may be evaluated by trained neural networks to determine whether a BEC event has occurred and/or is likely to occur. For example, a mathematical average of some of the email behavioral characteristics may be determined. It may be assumed that nine points are present for email behavioral characteristic employee availability 622, nine points are present for email behavioral characteristic messaging form 624, eight points are present for email behavioral characteristic user-specific profile 626, and eight points are present for email behavioral characteristic email determination 628. A mathematical average of these points equals eight and a half points, which may be compared to a predetermined threshold value, e.g., seven points. In response to a determination that the predetermined threshold has been exceeded, an account that is contacted by a predetermined business that the diagrams are based on may be determined to be spoofed, and an alert may be issued.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:

training a first neural network on email behavioral characteristics drawn from a threat intelligence data lake;

training a second neural network on email technical characteristics drawn from the threat intelligence data lake;

inputting data from an Endpoint Detection and Response (EDR) system, network traffic, and email to the neural networks for causing the neural networks to analyze the data;

generating an alert related to Business Email Compromise (BEC) based on output(s) from the neural networks; and instructing the neural networks to analyze the data, wherein analyzing the data includes:

generating a behavioral analysis neural network diagram, generating a technical indicators neural network diagram, wherein the behavioral analysis neural network diagram includes a plurality of first points each representative of events associated with one of email behavioral characteristics, wherein the technical indicators neural network diagram includes a plurality of second points each representative of events associated with one of email technical characteristics, wherein the output is generated based on a predetermined process for analyzing the neural network diagrams, wherein the predetermined process includes:

determining a first mathematical average of values associated with the first points, and determining a second mathematical average of values associated with the second points, comparing the first mathematical average to a first predetermined threshold, and comparing the second mathematical average to a second predetermined threshold.

2. The CIM of claim 1, wherein the first neural network is a radial-based neural network.

3. The CIM of claim 2, wherein the second neural network is a radial-based neural network.

4. The CIM of claim 1, wherein the email behavioral characteristics are selected from the group consisting of:

attack patterns, email cadence, messaging forms, user-specific profiles, and advanced persistent threats.

5. The CIM of claim 4, wherein the email technical characteristics are selected from the group consisting of: spoofed email addresses, compromised user accounts, known malicious internet protocols (IPs) and/or domains, network scanning, and technical threat intelligence.

6. The CIM of claim 1, wherein the alert is generated in response to a determination that the first mathematical average exceeds the first predetermined threshold, wherein the alert is generated in response to a determination that the second mathematical average exceeds the second predetermined threshold.

7. The CIM of claim 6, comprising: performing tuning on the first neural network and/or the second neural network based on the output(s) from the neural networks.

8. The CIM of claim 7, wherein the tuning is selected from the group consisting of: changing a rate of data ingestion, changing a mathematical formula used to calculate the output(s), and changing at least one of the thresholds used to analyze the neural network diagrams.

9. A computer program product (CPP), the CPP comprising:

a set of one or more computer-readable storage media; and program instructions, collectively stored in the set of one or more storage media, for causing a processor set to perform the following computer operations:

train a first neural network on email behavioral characteristics drawn from a threat intelligence data lake;

train a second neural network on email technical characteristics drawn from the threat intelligence data lake;

input data from an Endpoint Detection and Response (EDR) system, network traffic, and email to the neural networks for causing the neural networks to analyze the data;

generate an alert related to Business Email Compromise (BEC) based on output(s) from the neural networks; and instruct the neural networks to analyze the data, wherein analyzing the data includes:

generating a behavioral analysis neural network diagram, generating a technical indicators neural network diagram, wherein the behavioral analysis neural network diagram includes a plurality of first points each representative of events associated with one of email behavioral characteristics, wherein the technical indicators neural network diagram includes a plurality of second points each representative of events associated with one of email technical characteristics, wherein the output is generated based on a predetermined process for analyzing the neural network diagrams, wherein the predetermined process includes:

determining a first mathematical average of values associated with the first points, and determining a second mathematical average of values associated with the second points, comparing the first mathematical average to a first predetermined threshold, and comparing the second mathematical average to a second predetermined threshold.

10. The CPP of claim 9, wherein the first neural network is a radial-based neural network.

11. The CPP of claim 10, wherein the second neural network is a radial-based neural network.

12. The CPP of claim 9, wherein the email behavioral characteristics are selected from the group consisting of: attack patterns, email cadence, messaging forms, user-specific profiles, and advanced persistent threats.

13. The CPP of claim 12, wherein the email technical characteristics are selected from the group consisting of: spoofed email addresses, compromised user accounts, known malicious internet protocols (IPs) and/or domains, network scanning, and technical threat intelligence.

14. The CPP of claim 9, wherein the alert is generated in response to a determination that the first mathematical average exceeds the first predetermined threshold, wherein the alert is generated in response to a determination that the second mathematical average exceeds the second predetermined threshold.

15. The CPP of claim 14, the CPP comprising: program instructions, collectively stored in the set of one or more storage media, for causing the processor set to perform the following computer operations: perform tuning on the first neural network and/or the second neural network based on the output(s) from the neural networks.

16. The CPP of claim 15, wherein the tuning is selected from the group consisting of: changing a rate of data ingestion, changing a mathematical formula used to calculate the output(s), and changing at least one of the thresholds used to analyze the neural network diagrams.

17. A computer system (CS), the CS comprising:

a processor set;

a set of one or more computer-readable storage media; and program instructions, collectively stored in the set of one or more storage media, for causing the processor set to perform the following computer operations:

train a first neural network on email behavioral characteristics drawn from a threat intelligence data lake;

train a second neural network on email technical characteristics drawn from the threat intelligence data lake;

input data from an Endpoint Detection and Response (EDR) system, network traffic, and email to the neural networks for causing the neural networks to analyze the data;

generate an alert related to Business Email Compromise (BEC) based on output(s) from the neural networks; and instruct the neural networks to analyze the data, wherein analyzing the data includes:

generating a behavioral analysis neural network diagram, generating a technical indicators neural network diagram, wherein the behavioral analysis neural network diagram includes a plurality of first points each representative of events associated with one of email behavioral characteristics, wherein the technical indicators neural network diagram includes a plurality of second points each representative of events associated with one of email technical characteristics, wherein the output is generated based on a predetermined process for analyzing the neural network diagrams, wherein the predetermined process includes:

determining a first mathematical average of values associated with the first points, and determining a second mathematical average of values associated with the second points, comparing the first mathematical average to a first predetermined threshold, and comparing the second mathematical average to a second predetermined threshold.

18. The CS of claim 17, wherein the first neural network is a radial-based neural network.

\* \* \* \* \*